Figure 1:
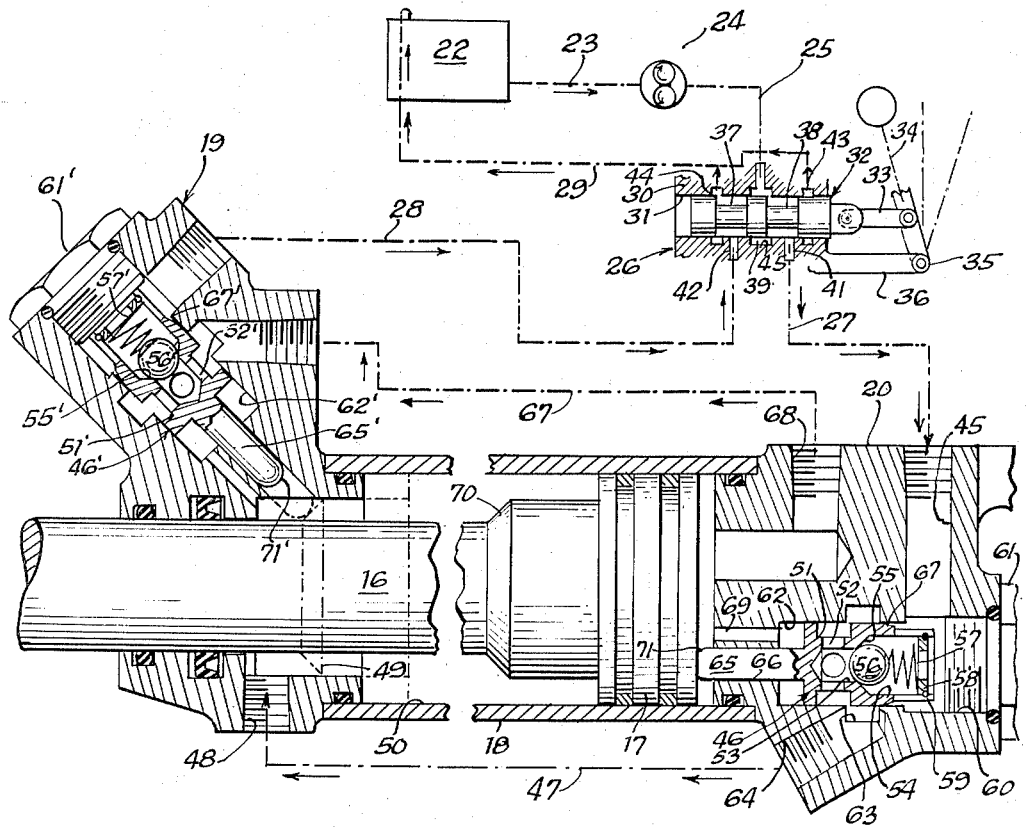

May 1, 1956

O. H. BANKER 2,743,704

AUTOMATIC STOP FOR FLUID MOTOR

Filed Oct. 14, 1954

INVENTOR.
Oscar H. Banker
BY Charles P. Vrtech
Att'y

United States Patent Office 2,743,704
Patented May 1, 1956

2,743,704

AUTOMATIC STOP FOR FLUID MOTOR

Oscar H. Banker, Evanston, Ill., assignor to New Products Corporation, Chicago, Ill., a corporation of Delaware Application October 14, 1954, Serial No. 462,266

8 Claims. (Cl. 121—38)

This invention relates to an automatic stop for fluid motors of the piston type.

Many fluid motors are required to perform a given operation in a predetermined time interval. For example, the fluid motors for retracting landing gear of aircraft may be required to retract a wheel completely in five seconds. Considering the weight of the wheel and the forces involved a considerable force must be developed by the motor to accelerate the mass of the wheel and its supporting strut and to set it in motion at the velocity required to complete the retracting operation in the specified five seconds. At the completion of the stroke, however, the mass of the wheel and its strut must be decelerated quite suddenly, and this deceleration must be timed with the specific location of the wheel and strut within the wing so that the moving force stops when the wheel is completely retracted.

It has been found on occasion that the momentum of the moving mass is so great that the wheel and its strut strikes the wing with considerable force and damages the wing structure.

It has been proposed that the movement of the fluid motor may be halted by causing the motor itself to actuate a dumping valve which will cut off the pressure to the pressure side of the piston when the latter reaches a position just short of the end of its stroke. Such a valve, however, may have the undesirable effect of venting the entire hydraulic system when it stops the piston and since the system may be utilized in an aircraft to operate other devices and to hold such other devices in operated condition while the landing gear is being retracted, the dumping of the fluid pressure by the motor for the landing gear would also dump the pressure in the remainder of the system and thereby create an unwanted condition in the associated hydraulic devices.

An object of this invention is the provision of an automatic stop mechanism for a hydraulic piston type motor which will cut off the pressure to the power side of the piston without at the same time unloading the pressure in the system.

A more specific object of this invention is to provide a fluid motor of the piston type and an automatic control therefore which will cut off the pressure to the power side of the piston at a predetermined position of the piston in its cylinder, said control including a valve disposed on the exhaust side of the piston and controlling the application of fluid under pressure to the power side of the piston, said valve being operated by the piston itself, or by some element movable in unison with the piston.

As another object, this invention seeks to provide a fluid motor control for a fluid motor of the piston type wherein the control provides a cushion for the exhaust side of the piston for preventing an excessively rapid operation of the motor, said cushion being automatically rendered operable upon the return stroke of the piston and the cushion effect being controlled by a shuttle valve acted upon by the fluid under pressure which is also acting upon the power side of the piston.

Figure 2:
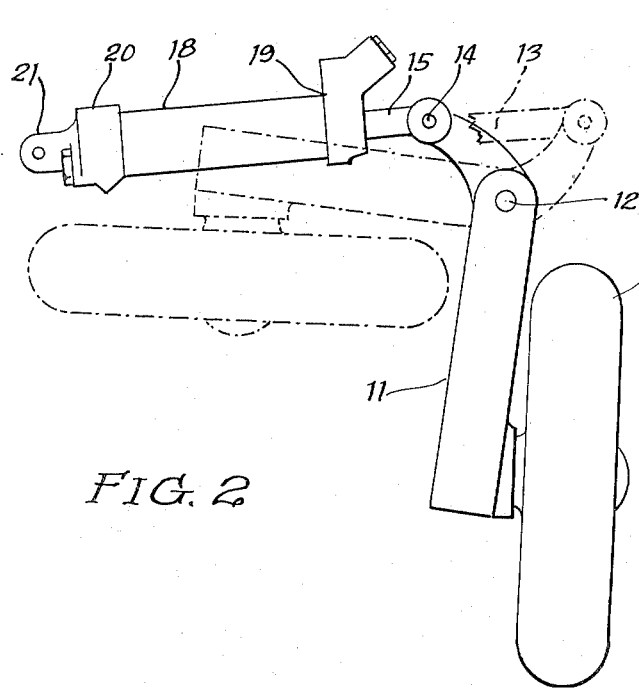
Figure 3:
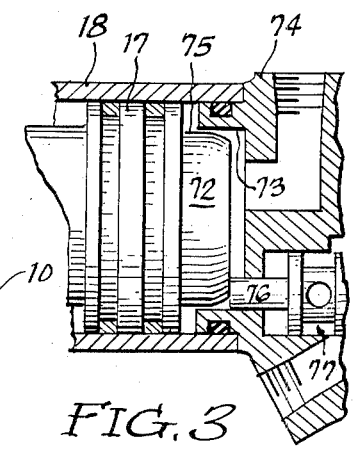

These and other objects and features of this invention will become apparent from the following detailed description when taken together with the accompanying drawings in which, Fig. 1 is a section through a hydraulic motor of the piston type incorporating features of this invention and showing schematically the hydraulic circuit and main control valve to be used therewith;

Fig. 2 shows schematically the manner in which the motor may be used to operate a retractile landing gear on an aircraft or the like; and Fig. 3 is a fragmentary section through one end of a modification of the motor.

Adverting first to Fig. 2, a typical installation of a power cylinder controlled in accordance with this invention comprises a landing wheel 10 mounted on a strut 11 adapted to swing about fixed pivot 12, secured to some suitable brace member of the aircraft wing structure, from the position shown in solid lines (Fig. 2) to a position such as that shown in dotted lines wherein it is completely withdrawn within the wing structure. Strut 11 extends beyond pivot 12 to form an operating arm 13 having a pivoted connection 14 with the free end 15 of a piston rod 16 and its associated piston 17 both of which are shown to better advantage in Fig. 1. Piston 17 is reciprocable in a cylinder 18 having cylinder heads 19 and 20 on opposite ends thereof. Cylinder head 20 may have formed thereon a boss 21 by which it may be secured for swinging movement about a fixed pivot on the wing structure, the swinging movement being dictated by the arcuate travel described by pivoted connection 14 between arm 13 and free end 15 of the piston rod 16.

It is the function of the control hereinafter to be described in detail to cause wheel 10 to swing about pivot 12 from the extended or solid position shown in Fig. 2 to the retracted or dotted position shown in that figure, and then back again, it being contemplated that both movements of the wheel are controlled by the fluid motor exemplified by cylinder 18 and that fluid under pressure will be utilized to effect both movements.

Referring now to Fig. 1 for a detailed description of the controls for the cylinder, fluid is stored in a tank or closed container 22 from which it may be drawn through a conduit 23 by a pump 24 which may be of the gear type. From pump 24 the fluid under pressure is conducted through a conduit 25 to a main control valve 26. From main control valve 26 fluid may be conducted through a conduit 27 to cylinder head 20, or through a conduit 28 to cylinder head 19, the exhaust fluid being conducted through either conduit 27 or 28 and valve 26 to a return conduit 29 connecting valve 26 to tank 22.

Valve 26 is comprised of a valve body 30 having a bore 31 therein within which is reciprocable a balanced cylindrical valve 32. The right hand end of valve 32, as viewed in Fig. 1, is connected by a link 33 to a hand lever 34 pivoted at 35 to a fixed arm 36 extending from valve body 30.

Valve 32 is formed with a pair of peripheral grooves 37, 38 forming a land 39 therebetween. Fluid under pressure from conduit 25 is conducted to a port 40 which extends around land 39 and is substantially of the same width as said land. Adjacent port 40 and symmetrically disposed with respect thereto on either side of the port are port 41 connected to conduit 27 and port 42 connected to conduit 28. Vent ports 43 and 44 are disposed on either side of ports 41 and 42 and are connected to the return conduit 29. It may be observed that peripheral grooves 37 and 38 are sufficiently wide to connect intake port 40 with one or the other of the adjacent ports 41, 42, and that they are also sufficiently wide to connect either one of the ports 41, 42 with a vent port 43, 44, respectively. Thus, in one position of control lever 34, port 40 is connected to port 41 while port 42 is connected to vent port 44, vent port 43 being blocked off from port 41 and vent port 44 being blocked off from inlet port 40. Control valve 26 therefore serves to admit fluid pressure to one side of piston 17 while venting the opposite side.

Briefly this invention comprises interposing a shuttle valve in the line from the main control valve 26 to the piston, the shuttle valve being located on the exhaust side of the piston and having an extension thereon adapted to be contacted by the piston when the latter reaches the end of its stroke. Accordingly, one such shuttle valve is disposed in each cylinder head and the valves are identical in shape and function. Due to the presence of the piston rod on one side of the piston, the cylinder heads themselves are not identical and hence the disposition of the valve in each head is somewhat different.

Conduit 27 is connected to a passage 45 in cylinder head 20, the passage extending transversely of the head to the shuttle valve, designated generally by the reference character 46 from which it is conducted through a cross-over passage, which may be a tube 47, to an inlet opening 48 extending radially inwardly in head 19 and in direct communication with a bore 49 of lesser diameter than the bore 50 of the cylinder 18.

Valve 46 is comprised of a cylinder having a peripheral groove 51 communicating through cross bores 52 to a central axial bore 53 communicating on the right hand side thereof as viewed in Fig. 1 with a larger axial bore 54 open to the exterior of the valve on the right hand side thereof. A shoulder formed between bores 54 and 53 constitutes the seat 55 of a check valve having a ball 56 urged against seat 55 by a conical spring 57 retained in bore 54 by a washer 58 and a snap ring 59. An access opening 60 is provided in head 20 in axial alignment with the valve 46 and closed by a sealed nut 61 threaded in opening 60.

A bore 62 is provided for valve 46 in head 20 in communication with passage 45, the bore being provided with a port 63 extending around valve 46 and opening into a passage 64 in communication with cross over passage 47.

Valve 46 is adapted to assume a position wherein its right hand end is in abutment with the bottom of sealed nut 61, and when so disposed, it cuts off passage 64 from passage 45 around the exterior of the valve, but it establishes communication between these passages through groove 51, cross bores 52, bore 53, ball 56 of the check valve and bore 54. Thus if fluid under pressure is present in passage 45, and valve 46 is moved to its extreme right hand position as just described by some suitable agency, fluid pressure is then cut off to the left hand side of piston 17. Should, however, the pressure in passage 45 be vented while valve 46 occupies its extreme right hand position, and fluid under pressure be introduced to the right hand side of the piston, then excess pressure in passageway 64 brought about by movement of piston 17 to the left is relieved through the check valve ball 56.

It should be observed that valve 46 will be made to assume its extreme left hand position in bore 62 by fluid under pressure acting upon the right hand end of the valve.

The means by which valve 46 is moved to its extreme right hand position is a dual means and results in a two-stage operation of the valve. The first means to operate upon the valve is the piston head itself which contacts a stud 65 formed on the left hand end of valve 46 and extending through an opening 66 provided therefor in head 20. It is understood that a reasonably close fit is established between stud 65 and its opening 66, but it is not necessary that the fit be fluid tight.

When piston 17 moves to the right as viewed in Fig. 1, by virtue of fluid under pressure conducted to the left hand side thereof from passage 45 around the rear portion of valve 46 into port 63 and passage 64 and then through cross-over passage 47 and inlet opening 48, the piston will strike the inner end of stud 65, and since the total pressure exerted by the fluid on piston 17 is greater than the total pressure exerted on valve 46 by the same fluid, valve 46 will be moved to the right by piston 17 until it cuts off or closes port 63. It may be observed that a slight taper 67 is formed around the outside corner of valve 46 so that the cutting off of the fluid to cylinder 18 is gradual. Just as soon as the fluid pressure is cut off, piston 17 stops. Valve 46, therefore, likewise stops and is held in a position intermediate its extreme left hand and right hand positions. This constitutes the first stage of movement of the valve.

The second stage of movement of valve 46 is effected when main control valve 26 is moved by lever 34 to its right hand position as viewed in Fig. 1. In this position communication is established from conduit 25 and pump 24 through valve 26 to conduit 28, and conduit 27 is correspondingly vented through peripheral groove 38 and port 43. The introduction of fluid under pressure into conduit 28 causes fluid under pressure to be introduced into a cross-over passage 67 through means to be hereinafter described but which is in general substantially identical with the valve 46, and from cross over passage 67 through an inlet passage 68 to the right hand side of piston 17. The cylinder between head 20 and the right hand side of piston 17 then becomes filled with fluid under pressure which passes through a bleed opening 69 into valve bore 62. The fluid thus introduced into bore 62 creates a pressure against valve 46 moving said valve to the right, and this movement will continue until the valve strikes the sealed nut 61. In this position peripheral groove 51 is in alignment with port 63 and the valve is conditioned for exhausting fluid from the left hand side of piston 17.

The continued supply of fluid under pressure to the right hand side of piston 17 causes said piston to move to the left, thereby pushing ahead of it such fluid as has been trapped on that side. This trapped fluid escapes through opening 48, cross-over passage 47, passage 64, peripheral groove 51, cross bores 52 and the ball check valve 56 into passage 45, from which it is then conducted through passage 27 and valve 26 to the return conduit 29 and the supply tank 22.

Although valve 46' shown in head 19 is identical in every respect with the corresponding valve in head 20, head 19 is different in that valve 46' is disposed in a bore 62' which is inclined to the axis of piston rod 16. This is made necessary by the fact that the difference in diameter between piston 17 and rod 16 is not sufficiently great to accommodate valve 46'. In place of a direct coaction between piston 17 and stud 65', piston 17 is formed with a step terminating in a shoulder 70 disposed at an angle to the axis of the piston or, in other words, of frusto-conical contour. Rounded stud end 71' extends into bore 49 into which the step is adapted to move at the left hand end of the piston stroke. The action of shoulder 70 against rounded end 71' causes the same axial travel of valve 46' as does the direct contact between piston 17 and the corresponding end 71 of valve 46.

It is understood that valve 46' operates in precisely the same manner as valve 46 and hence its operation will not be described in detail.

It may be noted that movement of piston 17 in either direction is dependent not only upon the fluid pressure behind the piston, but also upon the rapidity with which the fluid ahead of the piston, that is, on the exhaust side of the piston, can be swept out of the cylinder and through the cross bores 52 and ball check valve 56 to the exhaust or return conduit 29. The emptying of the cylinder ahead of the piston can be controlled by the size of cross bores 52. There is thus provided a dash-pot action which may be used to give a controlled uniform movement of piston 17 and prevents a sudden shock or jar during the initial movement of piston 17. It may also be noted that since the valve which controls the admission of fluid under pressure to the piston is closed by the piston itself, and furthermore, is closed over a predetermined travel of the piston by the chamfered corner 67, cessation of movement of the piston 17 is brought about in a gradual manner, and slamming of the device controlled by the fluid motor will be eliminated.

The point in cylinder 18 at which piston 17 is brought to rest is determined by the location of the end 71 of valve stud 65. The longer the stud 65 the greater will be the margin of safety provided against over-travel of the piston due to inertia forces in the system controlled thereby. If any such over-travel is present for any reason, the dash-pot action of the fluid remaining on the exhaust side of the piston comes into play and assists in dissipating such inertia forces before the piston can strike the head toward which it is moving.

The clearance between shouldered portion 70 of piston 17 and bore 49 is preferably such as to restrict the flow of fluid out of the cylinder to provide the dash-pot action mentioned above. A similar construction may be used on the right-hand side of piston 17 as viewed in Fig. 1, and as shown in Fig. 3. Thus piston 17 may be formed with a cylindrical protuberance 72 which is adapted to enter a bar 73 formed in head 74 near the end of the stroke of the piston in the direction of said head. The clearance between the cylindrical surface 75 and bore 73 is such that flow of fluid out of cylinder 18 is restricted to provide the desired dash-pot action. The valve stud 76 of the valve 77 is engaged by the end of protuberance 72 and valve 77 may otherwise be formed and function in the same manner as valve 46.

It is understood that the foregoing description is merely descriptive of a preferred embodiment of the invention and that the scope of the invention therefore is not to be limited thereto but is to be determined by the appended claims.

I claim:

1. A fluid operated motor comprising a cylinder, a piston reciprocable in the cylinder, a source of fluid under pressure, a main control valve for the fluid under pressure, and a shuttle valve, means extending into the path of movement of the piston and connected to the shuttle valve to move the valve in timed relation to the movement of the piston, said means being adapted to be contacted by the piston just prior to the end of the stroke of the piston, said shuttle valve being connected hydraulically in series between the main control valve and the piston and controlling the application of fluid under pressure to the piston in its movement toward the shuttle valve, such that communication between the piston and the fluid under pressure from the main control valve is automatically cut off when the piston reaches a predetermined position in the cylinder, a check valve in the shuttle valve adapted to be opened by the fluid in the cylinder, said shuttle valve having an opening therein adapted to connect the interior of the cylinder with the check valve, and means operated by pressure fluid in the cylinder for moving the shuttle valve to increase the size of the said opening.

2. A fluid operated motor comprising a cylinder, a piston reciprocable in the cylinder, a cylinder head at each end of the cylinder, a source of fluid under pressure, a main control valve for the fluid under pressure, and a shuttle valve in one of the heads and extending into the path of movement of the piston, said shuttle valve being connected in series between the main control valve and the piston and controlling the application of fluid under pressure to the piston in its movement toward the shuttle valve, such that communication between the piston and the fluid under pressure from the main control valve is automatically cut off when the piston reaches a predetermined position in said cylinder, said shuttle valve including a check valve which is closed to pressure fluid from the said source of fluid under pressure, and said shuttle valve including further a port which is opened by movement of the valve by the piston and which port exposes the check valve to the fluid on the side of the piston opposite that contacting the valve.

3. A fluid operated motor comprising a cylinder, a piston reciprocable in the cylinder, a cylinder head at each end of the cylinder, a source of fluid under pressure, a main control valve for directing fluid under pressure to one side or the other of the piston, a shuttle valve hydraulically in series with the main control valve in one of the heads and extending into the path of movement of the piston such that the shuttle valve is moved in one direction by the piston, and means for conducting the fluid under pressure around said shuttle valve to the piston, said means including an opening in the head and means on the valve for gradually restricting said opening whereby when said valve is moved by the piston said valve will cut off the flow of pressure fluid to the piston and arrest the movement of the piston, said valve having a vent opening therethrough, there being a passageway connecting the cylinder on the side of the piston adjacent the valve with the side of the valve adjacent the piston such that fluid under pressure introduced into the said cylinder on the side of the piston adjacent the valve causes the valve to move in the same direction as it is moved by the piston to vent the opposite side of the piston through said valve.

4. A fluid operated motor comprising a cylinder, a piston reciprocable in the cylinder, a cylinder head at each end of the cylinder, a source of fluid under pressure, a main control valve for directing fluid under pressure to one side or the other of the piston, a shuttle valve in series with the main control valve in one of the heads and urged by the fluid under pressure to admit said fluid to one side of the piston, means for admitting fluid under pressure to the opposite side of the piston and to the opposite side of the valve when the fluid under pressure to the first said side of the valve is cut off by the main control valve, means on the shuttle valve extending into the path of movement of the piston and adapted to move the valve by said piston when the said one side of the piston is subjected to fluid under pressure, and means on the valve for gradually restricting the flow of fluid under pressure to the said one side of the piston when said piston contacts the extending means on the shuttle valve and moves said shuttle valve to its pressure fluid cut off position.

5. A fluid operated motor comprising a cylinder, a piston reciprocable in the cylinder, a cylinder head at each end of the cylinder, a piston rod extending through one cylinder head, a source of fluid under pressure, a main control valve for directing the fluid under pressure to one side of the piston and venting the other side of the piston, a shuttle valve in each head, each said shuttle valve being hydraulically in series with the main control valve and with one side of the piston, each said shuttle valve having one end exposed to the fluid under pressure and movable thereby to admit fluid under pressure to the side of the piston opposite the head in which the shuttle valve is disposed, an extension on each shuttle valve having the free end thereof disposed in the path of movement of the piston such that as the piston nears a cylinder head it will contact the extension and move the associated shuttle valve against the fluid under pressure to an intermediate position wherein the shuttle valve cuts off the fluid under pressure to the piston, there being a passageway connecting the side of the shuttle valve opposite the side exposed to the pressure fluid to the side of the piston adjacent the valve such that when the main control valve admits fluid under pressure to the opposite side of the piston and vents the side previously exposed to the fluid under pressure, the shuttle valve will be moved to a second position, there being a vent opening in the shuttle valve exposed to the side of the piston previously exposed to fluid under pressure, and a check valve in the shuttle valve adapted to be opened by the fluid exhausted from the side of the piston previously exposed to the pressure fluid to allow the exhaust fluid to drain out of the exhaust side of the piston.

6. A fluid pressure operated motor as described in claim 5, said shuttle valve having a land adapted to close the passage from the main control valve to the piston and a tapered region on said land by which the fluid under pressure is gradually cut off from the piston as the shuttle valve is moved by said piston.

7. A fluid operated motor comprising a cylinder, a piston reciprocable in the cylinder, a source of fluid under pressure, a main control valve for the fluid under pressure, a shuttle valve connected hydraulically in series between the main control valve and the piston and controlling application of fluid under pressure to the piston in its movement toward the shuttle valve, means extending into the path of movement of the piston and connected to the shuttle valve to move the valve in timed relation to the movement of the piston in one direction of movement of the piston, said means being contacted by the piston just prior to the end of the stroke of the piston to move the shuttle valve to a first position in which fluid under pressure is cut off from the piston to arrest the movement of the piston, means subject to fluid under pressure introduced into the cylinder to reverse the movement of the piston for moving the shuttle valve to a second position, and a check valve in the shuttle valve and adapted to vent one side of the cylinder, said shuttle valve in said second position providing greater overlap of the shuttle valve in its said pressure cut off position while exposing the check valve to vent said one side of the cylinder.

8. A fluid operated motor as described in claim 7, said cylinder including a cylinder head having an axially disposed recess in which the shuttle valve is adapted to reciprocate, said means extending into the path of movement of the piston comprising a pin extending from the shuttle valve through the cylinder head and into the cylinder, and said means subject to fluid under pressure in the cylinder for moving the shuttle valve to a second position comprising a face on the shuttle valve, said cylinder head having a passage therein communicating said face with the interior of the cylinder to subject said shuttle valve face to the cylinder pressure as aforesaid.

References Cited in the file of this patent

UNITED STATES PATENTS

| | | |
|---|---|---|
| 695,675 | Ebel | Mar. 18, 1902 |
| 917,642 | McElroy | Apr. 6, 1909 |
| 1,714,545 | Burns | May 28, 1929 |
| 2,258,585 | Hedene | Oct. 14, 1941 |
| 2,270,767 | Platz | Jan. 20, 1942 |
| 2,447,968 | Trotter | Aug. 24, 1948 |
| 2,493,602 | Sterrett | Jan. 3, 1950 |